United States Patent

Spreuer

[15] 3,691,366
[45] Sept. 12, 1972

[54] TELESCOPING LIGHT BAR
[72] Inventor: Philip M. Spreuer, Rt. 1, La Grange, Ind. 46761
[22] Filed: Sept. 23, 1970
[21] Appl. No.: 74,720

[52] U.S. Cl. ..................240/8.3, 40/129 C, 340/87
[51] Int. Cl. ...............................................B60q 7/00
[58] Field of Search..........240/83, 52, 52.11, 71.1 C, 240/73 QD; 40/129 C; 340/87, 100

[56] References Cited

UNITED STATES PATENTS

| | | |
|---|---|---|
| 2,738,492 | 3/1956 | Arneson et al. ..............340/87 |
| 3,059,105 | 10/1962 | Roe et al. ....................240/8.3 |
| 3,278,741 | 10/1966 | Wood..........................240/7.1 |
| 3,474,411 | 10/1969 | Collins.........................340/87 |

FOREIGN PATENTS OR APPLICATIONS 1,091,885  10/1960  Germany....................240/8.3

Primary Examiner—Louis J. Capozi
Attorney—Clarence A. O'Brien and Harvey B. Jacobson

[57] ABSTRACT

A structural assembly having a central tubular section telescopingly mounting two longitudinally extending members that are adjusted for attachment at the outward ends thereof to a vehicle. Coiled power cords are received in the assembly and furnish selective energization for various lights fastened to the tubular section and the telescoping members. The coiled power cords facilitate extension and retraction of the telescoping members without snagging.

8 Claims, 5 Drawing Figures

PATENTED SEP 12 1972

3,691,366

Philip M. Spreuer
INVENTOR.

BY Clarence A. O'Brien
and Harvey B. Jacobson
Attorneys

TELESCOPING LIGHT BAR

The present invention relates to detachable light bars that have telescoping members permitting rapid adjustment across the rear end of a vehicle.

Recognizing the need for adequate lighting on occasionally used vehicles of various sorts that are not permanently equipped with proper lighting, the principal object of the present invention is to provide side-rear lighting for these vehicles. Thus, in the case of a small open trailer, this object is accomplished by providing a quickly detachable, fully wired light bar that is adjustable in length. A simple plug-in connector in conjunction with quick detach means enables the light bar to be changed over from one vehicle to another in a short period of time.

The present light bar essentially consists of telescoping members that extend laterally outwardly from a central tubular section. Conventional rear vehicle lights are mounted on the various parts of the light bar thereby informing following road vehicles of braking action and the driver's intent to turn. All wires are enclosed inside the body of the telescoping light bar to afford adequate protection for the wiring. A coiled power cord is formed from the enclosed wire to permit adjustment of the wires to all lengths of the bar without adverse effects such as snagging. Simple metal clamps are fastened at the outward ends of the light bar to permit secure mounting of the light bar to a vehicle chassis.

The present invention is particularly suited for temporary, removable lighting on the highway for the following vehicles: boat trailers, large boats in transit, farm machinery, camper and travel trailers, mobile homes, construction machinery, and portable equipment of all kinds.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
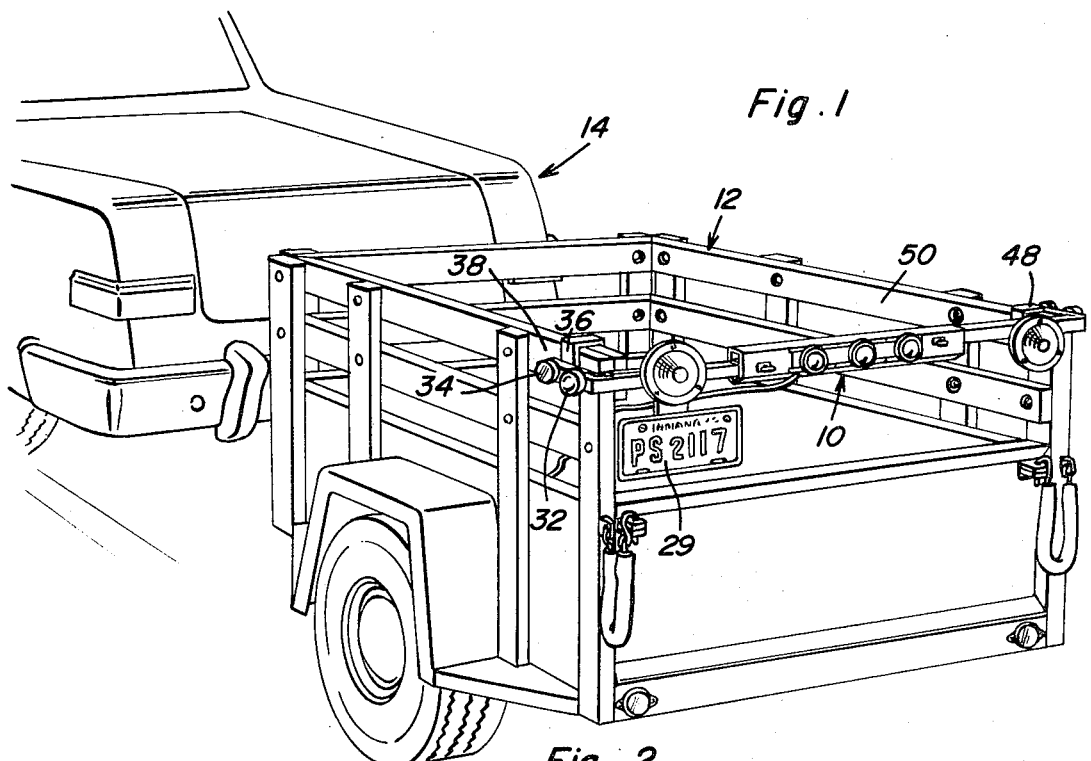
FIG. 1 is a perspective view illustrating the disposition of the present invention on a drawn trailer.

Referring to the figures and more particularly FIG. 1, reference numeral 10 generally indicates the light bar of the present invention and is seen to be mounted across the upper rear end of a trailer 12 drawn by an automobile 14. Although the figure illustrates a typical utilization of the present light bar, this is not to be interpreted as a limitation on the type of vehicle that the present invention can be used with. On the contrary, the purpose of the invention is for wide adaptability to vehicles not ordinarily fitted with proper rear end lights.

Figure 2:
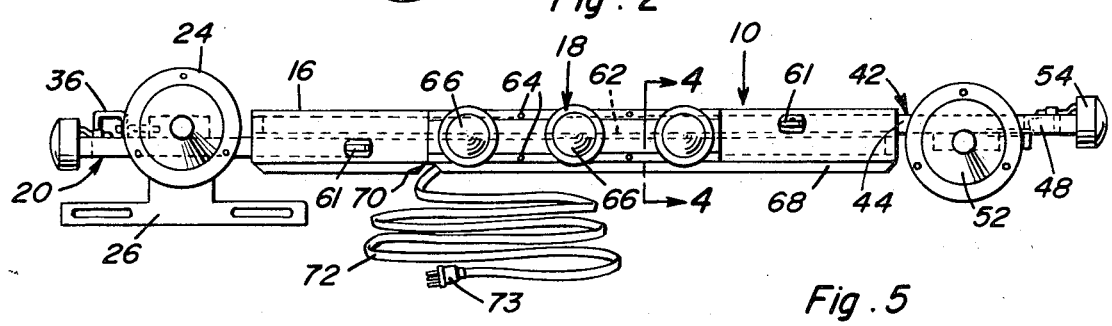
FIG. 2 is a front elevational view illustrating the exterior appearance of the present light bar.
Figure 3:
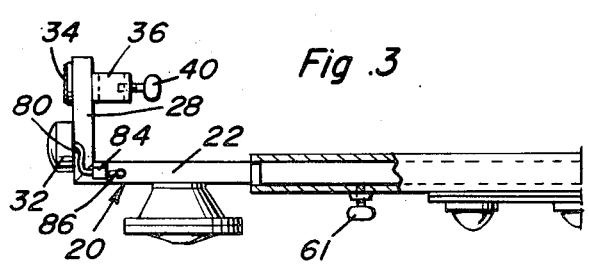
FIG. 3 is a partial top plan view of the left light bar end portion.

Referring to FIG. 2, the structure of the present invention is seen to include a central tubular section 16 having a lamp assembly 18 suitably connected thereon and energized through a power cord to be discussed hereinafter. A first telescoping section 20, preferably fabricated from a tubular material of square cross-section, extends longitudinally outwardly from the left end of the central section 16. The telescoping section 20 is slidably disposed and adjustable with respect to the central section 16. As indicated in FIG. 3, the telescoping section includes a first portion 22 that is coextensive with the central section 16. At the outward end of the longitudinal section 22, is a perpendicularly offset end portion 28 extending laterally from the longitudinal section 22. As shown in FIG. 2, the longitudinal section 22 has a light 24 suitably fastened thereto which contains bulbs for use as a tail light and to signal braking and left directional turning after selective signaling the usual manner. A license plate bracket 26 is attached to the longitudinal portion 22 and serves to mount a license plate 29 as seen in FIG. 1 which is illuminated by a window under the tail light in the usual manner. A clearance light 32 is suitably fastened to the outward face of the offset end portion 28 and becomes selectively energized as hereinafter discussed. As an additional safety precaution, a reflector 34 is positioned adjacent the clearance light 32. As shown in FIGS. 2 and 3, an inverted generally U-shaped bracket 36 is secured to the outward end of the offset portion 28 and serves as a means for fastening the left end of the light bar to a lateral brace member 38 (FIG. 1) of the towed trailer 12. A thumbscrew 40 clamps the bracket against the brace quickly and efficiently while also rendering removal equally rapid.

As seen in FIG. 2, a second telescoping section 42 extends outwardly in the right direction and as in the case of the aforementioned telescoping section 20, the second telescoping section 42 includes a longitudinal portion 44 identical to the longitudinal portion 22 aforementioned. Also, the outward end of the longitudinal portion articulates to a perpendicularly offset portion 46 illustrated in FIG. 4. The offset end portion 46 mounts a clamp bracket 48 identical to clamp bracket 36, aforementioned, which secures the right end of the telescoping bar to the brace member 50 (FIG. 1) of the trailer 12. As to the longitudinal portion 44, a light 52, identical to light 24, is fastened to the longitudinal portion and complements the light 24 in performing tail, braking and right directional signal indicators. As will be noted in FIG. 4, a clearance light 54 similar to 32, aforementioned, and a reflector 56 similar to 34, are mounted to the offset portion of the telescoping section 42.

Figure 4:
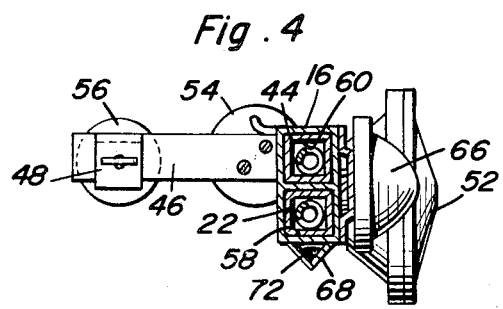
FIG. 4 is a transverse sectional view taken along a plane passing through section line 4—4 of FIG. 2.

Considering the interior configuration of the central section 16, reference is made to FIG. 4 wherein the interior of the central section is seen to include a lower square shaped channel or guide 58. A second square channel or guide 60 is disposed in vertical aligned spaced relation with the channel 58. The purpose of these channels or guides is to slidingly receive associated telescoping sections 20 and 42, respectively. Thus, as clearly indicated in FIG. 2, the left telescoping section 20 is positioned below the upper telescoping section 42.

Figure 5:
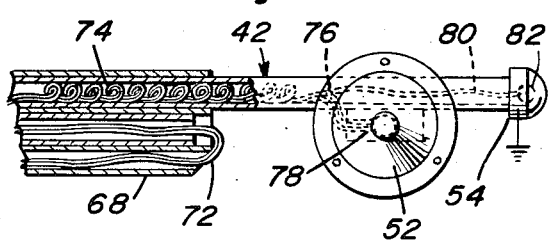
FIG. 5 is a partial sectional view illustrating the location of a coiled power cord within the telescoping bar.

Referring to FIG. 2, the central lamp assembly 18 is seen to include a mounting bracket 62 that is suitably attached to the rear face of the central section 16 by fasteners 64. Three horizontally spaced lamps 66 serve as clearance lights for following traffic. The lower edge of the central tubular section 16 is clearly shown in FIGS. 2, 4 and 5 to include a V-shaped channel 68 which serves as a conduit for an inwardly extending power cord 72 which passes through a slot 70 formed in the V-shaped channel 68 and lies therein along the length of the central tubular section 16. As indicated in FIG. 5, the power cord 72 is pulled through the V-shaped channel 68 and then into the telescoping sections 20 and 42. The power cord 72 includes a number of conductors that allow selective energization of the lights 24, 52, 66, 32 and 54. Selective energization is effected when the connector 73 at the outward end of power cord 72 is hooked into a mating connector that in turn is connected in parallel with the usual vehicle lamp control switches. The power cord 72 is divided into parallel connected ends that are respectively connected to the light assembly 18, the lights on telescoping section 20 and the lights on telescoping section 42. As will be noted in FIG. 5, the portion 74 of the power cord that resides within each telescoping section is coiled so that the wire will extend and retract in accordance with the position of the telescoping section. This feature prevents the power cord portion in the telescoping sections from becoming snagged during adjustment of the telescoping sections.

By way of example, FIG. 5 illustrates the connection of the power cord portion in the telescoping section 42. As will be noted, a junction point 76 exists from which a conductor 80 extends to the clearance light lamp 82 while a second multiple wire conductor extends from point 86 to a multiple filament lamp or lamps in light 52. FIG. 3 illustrates how the conductor 80 connected to the clearance light on the offset portion of the telescoping section, is physically located. More particularly, an opening 86 is formed at the outward end of each longitudinal telescoping section portion to allow exit of conductors 80. The outward end of the conductors are connected to the bulbs 82 in the clearance lights 32, 54. A simple cable clamp 84 is mounted to the longitudinal portion 22 and serves to clamp the conductors against their associated telescoping sections.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A light bar comprising a section, at least one member telescopingly positioned on the section for adjustably varying the length of the bar, at least one lamp mounted on one of said section and member, a power cord of adjustable length extending into the bar for furnishing said lamp with power, and means arranged on said section and member for mounting the light bar to an object, the power cord being coiled to produce a flexibly resilient unit that extends and retracts in response to expansion and retraction of the telescoping member.

2. The structure of claim 1 wherein at least one additional lamp is mounted on the section, the power cord being electrically connected thereto for selective energization.

3. A telescoping light bar for removable mounting across an object, the bar comprising a central section having perpendicularly spaced, parallel guides provided thereon, telescoping sections adjustably positioned on respective guides and extendable from said central section in opposite directions for selectively varying the expanse of the bar, a light secured to at least one said sections, and clamp bracket means mounted at the outer end of each of said telescoping sections for mounting the bar on an object and fixing the length of the bar.

4. The structure as defined in claim 3 wherein said central section includes a pair of coextensive tubular members of polygonal cross section defining said guides, said telescoping sections having a corresponding cross-sectional configuration to prevent relative rotation between the sections, means on one of said telescoping sections to support a license plate for illumination by the light thereon, and a clearance light mounted on each clamp bracket means.

5. The structure as defined in claim 3, wherein a power cord is arranged on the bar and connected to said light for providing energization thereto, said power cord extending and retracting with its associated telescoping section for preventing the cord from snagging.

6. The structure of claim 5 wherein additional lights are mounted on the other sections and are connected with power cords, the cords including individual wires for selective energization of the lights on the central section and the lights on the telescoping sections.

7 The structure of claim 6 wherein the telescoping sections respectively articulate to offset end portions having additional lights fastened thereon, said lights being electrically connected to certain selected wires in the power cords.

8. The structure as defined in claim 7 wherein said central section includes a pair of coextensive tubular members of polygonal cross section defining said guides, said telescoping sections having a corresponding cross-sectional configuration to prevent relative rotation between the sections, means on one of said telescoping sections to support a license plate for illumination by the light thereon, and a clearance light mounted on each clamp bracket means.

* * * * *